United States Patent
Salmikuukka et al.

(10) Patent No.: US 10,703,606 B2
(45) Date of Patent: Jul. 7, 2020

(54) WIRELESS COMMUNICATION IN AN ELEVATOR

(71) Applicant: KONE Corporation, Helsinki (FI)

(72) Inventors: Jukka Salmikuukka, Espoo (FI); Aki Parviainen, Hyvinkää (FI); Kenneth Kronkvist, Vantaa (FI); Ari Väistö, Riihimäki (FI)

(73) Assignee: KONE CORPORATION, Helsinki (FI)

( * ) Notice: Subject to any disclaimer, the term of this patent is extended or adjusted under 35 U.S.C. 154(b) by 160 days.

(21) Appl. No.: 15/447,929

(22) Filed: Mar. 2, 2017

(65) Prior Publication Data

US 2017/0174471 A1    Jun. 22, 2017

Related U.S. Application Data

(63) Continuation of application No. PCT/FI2014/050751, filed on Oct. 2, 2014.

(51) Int. Cl.
*B66B 1/34* (2006.01)
*B66B 11/02* (2006.01)
*H04W 84/12* (2009.01)

(52) U.S. Cl.
CPC ........ *B66B 1/3446* (2013.01); *B66B 11/0226* (2013.01); *B66B 2201/00* (2013.01); *H04W 84/12* (2013.01)

(58) Field of Classification Search
CPC . H04W 16/26; H04W 84/042; H04W 88/085; H04W 84/12; H04B 7/15535;
(Continued)

(56) References Cited

U.S. PATENT DOCUMENTS 6,895,218 B2 * 5/2005 Yarkosky ............. H04B 7/2606
455/11.1
7,065,350 B2 * 6/2006 Capobianco .......... H04W 88/04
455/11.1
(Continued)

FOREIGN PATENT DOCUMENTS

CN    1879322 A      12/2006
CN    202663399 U  *  6/2012
(Continued)

OTHER PUBLICATIONS

The First Office Action issued in corresponding Chinese Application No. 201480082451.2 dated Jul. 27, 2018, with English translation.

*Primary Examiner* — Andrew Lai
*Assistant Examiner* — Harry H Kim
(74) *Attorney, Agent, or Firm* — Birch, Stewart, Kolasch & Birch, LLP

(57) ABSTRACT

A data communication arrangement for elevators is disclosed. In the arrangement a directional antenna is used for transmitting data from elevator car. Correspondingly, the counterpart antenna in the end of the elevator shaft is transmitting with a directional antenna. In the elevator a further omnidirectional antenna is used to communicate with the terminal devices belonging to passengers. The properties of antennas may be adjusted based on the speed and location of the elevator car. In addition to the properties of antennas also other transmission characteristics may be adjusted based on the same information.

12 Claims, 2 Drawing Sheets

(58) Field of Classification Search
CPC . H04B 7/2606; B66B 1/3446; B66B 11/0226; B66B 2201/00; B66B 2201/34
See application file for complete search history.

(56) References Cited

U.S. PATENT DOCUMENTS

| | | | | |
|---|---|---|---|---|
| 7,134,530 B2* | 11/2006 | Motoyama | B66B 1/34 | 187/391 |
| 7,835,694 B2* | 11/2010 | Shiff | H04W 16/26 | 370/315 |
| 7,962,095 B2* | 6/2011 | Periyalwar | H04B 7/15542 | 455/11.1 |
| 7,973,714 B2* | 7/2011 | Lee | H01Q 1/40 | 342/374 |
| 8,059,031 B2* | 11/2011 | Lee | H01Q 1/40 | 342/374 |
| 2003/0148765 A1* | 8/2003 | Ma | H04W 36/32 | 455/438 |
| 2004/0264451 A1* | 12/2004 | Kujala | H04L 29/12311 | 370/389 |
| 2005/0020273 A1* | 1/2005 | Fong | H04W 72/1252 | 455/453 |
| 2005/0254653 A1* | 11/2005 | Potashnik | H04L 9/321 | 380/270 |
| 2006/0046642 A1 | 3/2006 | Bassiri et al. | | |
| 2006/0223573 A1* | 10/2006 | Jalali | H04W 36/0055 | 455/552.1 |
| 2008/0232296 A1* | 9/2008 | Shin | H04B 7/155 | 370/315 |
| 2008/0261520 A1* | 10/2008 | Bassiri | H04B 7/15535 | 455/7 |
| 2009/0300740 A1* | 12/2009 | Verma | H04L 63/062 | 726/6 |
| 2010/0087216 A1* | 4/2010 | Ko | H04B 7/1555 | 455/500 |
| 2012/0129458 A1* | 5/2012 | Yim | | |
| 2013/0257673 A1 | 10/2013 | Wang et al. | | |
| 2015/0171940 A1* | 6/2015 | Park | H04B 7/0626 | 375/267 |

FOREIGN PATENT DOCUMENTS

| | | |
|---|---|---|
| CN | 202663399 U | 1/2013 |
| WO | WO 01/14237 A1 | 3/2001 |
| WO | WO0114237 A1 * | 3/2001 |
| WO | WO 2005/053189 A | 6/2005 |
| WO | WO2005053189 A1 * | 6/2005 |

* cited by examiner

WIRELESS COMMUNICATION IN AN ELEVATOR

CROSS REFERENCE TO RELATED APPLICATIONS

This application is a Continuation of PCT International Application No. PCT/FI2014/050751, filed on Oct. 2, 2014, which is hereby expressly incorporated by reference into the present application.

FIELD OF THE INVENTION

The invention relates to an arrangement in an elevator for facilitating wireless data transfer by providing an enhanced arrangement for wireless local area networks.

BACKGROUND OF THE INVENTION

Wireless local area networks are used in various applications instead of wired connections. One example is mobile phones and other mobile devices. These devices have become very popular and thus, wireless networks are widely provided. Many mobile device users prefer wireless local area networks instead of mobile communications, such as 3G- or LTE networks because wireless local area networks are typically capable of providing higher transfer rate and many times they are provided free of charge while mobile communications are often bound by additional costs. A known problem of wireless local area networks is that they do not hand moving mobile station as well as mobile communication networks, which are designed with particular standardized hand-over functionality. In other words, they are often the preferred choice when the user of the mobile device does not move but needs high bandwidth in data transfer.

Even if wireless local area networks work generally quite well there is a plurality of special cases that require special purpose solutions. For example, providing a network connection in a fast train or car includes problems relating to high speed and lack of wired cables. The present application addresses corresponding problems in the field of elevators. An elevator includes special features as it moves in an elevator shaft and never leaves it. When the building is not high it is possible to provide just an ordinary wireless local area router, or a base station, to which mobile devices can connect. The coverage of a wireless local area network base station depends on various aspects, however, it is not typically more than 50 meters in an urban environment and in most cases it is lot less than 20 meters. In addition to the long distance the elevators move fast in high buildings and this causes further problems.

When the building gets higher it means that the coverage area of the router must be increased. This is typically done by increasing power, which leads into a plurality of problems. When the power of the router is increased more and more mobile stations try to connect to it and it might suffocate under the burden of requests. In very high buildings the need for power increase might be more than the mobile devices are capable of. In other words, even if the transmitting power of the router may be increased in order to transmit to mobile stations, the mobile stations might not be powerful enough to respond and the communication is not successful.

Further problems for conventional routers are caused by, for example, the Doppler effect of moving elevator car, multipath propagation in the elevator shaft, metallic structures and walls in the and similar commonly known problems.

Thus, it is obvious that the conventional wireless local area network arrangement have drawbacks particularly in providing high quality service in high building comprising fast moving elevators. Thus, there is a need for providing enhanced solutions for data transfer in elevators.

Conventionally data and telecommunications in an elevator system have been arranged by using a wired connection, however the cables suitable for high speed data transfer, particularly optical fibers, are not suitable to be used together with an elevator rope because of their properties. Furthermore, the wired connection involves an additional weight. A problem of the additional weight is that moving it requires energy and stronger supporting structures. Thus, any additional weight needs to be avoided whenever it is possible. Furthermore, if the wire is broken the reparation process might not be easy. Thus, there is a plurality of drawbacks in using wired communications in an elevator.

SUMMARY

The invention discloses a data communication arrangement for elevators. In the arrangement a directional antenna is used for transmitting data from elevator car. Correspondingly, the counterpart antenna in the end of the elevator shaft is transmitting with a directional antenna. In the elevator a further omnidirectional antenna is used to communicate with the terminal devices belonging to passengers. The properties of antennas may be adjusted based on the speed and location of the elevator car. In addition to the properties of antennas also other transmission characteristics may be adjusted based on the same information.

In an embodiment the invention is implemented as a method for providing a local area wireless network in an elevator car. The method comprises communicating with at least one terminal device using a wireless local area network connection by using a wireless base station in the elevator. The method further comprises transceiving the communication between the at least one terminal device and the wireless base station by using a directional antenna at the elevator with a transceiver located in the end of the elevator shaft opposing the directional antenna.

In a further embodiment the method further comprises determining the distance between the antenna located on the elevator car and the transceiver located in the end of the elevator shaft opposing the directional antenna and adjusting transmitting properties in the transceiving according to the determined distance. In a further embodiment the method further comprises determining the speed of the elevator car; and choosing the data transmission speed according the speed of the elevator car.

In a further embodiment the method further comprises switching the transceiving from the directional antenna to an omnidirectional antenna communicating with a transceiver located in the vicinity of the stopping location and switching the transceiving back to the directional antenna when the elevator car starts moving again. In a further embodiment the switching is performed by adjusting transmission properties of the antenna.

In a further embodiment the communication is arranged through a plurality of base stations arranged in a mesh network. In a further embodiment at least one of the following properties: transmission power, directivity of the antenna, direction of the transmission, location of the source of the transmission and data transfer rate is adjusted.

In an embodiment of the invention a system for providing a local area wireless network in an elevator car is provided. The system comprises a wireless local area base station configured to communicate with at least one terminal device in the elevator car and a directional antenna configured to transceive the communication between the at least one terminal device and the wireless base station by using a directional antenna at the elevator with a transceiver located in the end of the elevator shaft opposing the directional antenna.

In an embodiment the system further comprises an elevator controlling system and a controller (14) configured to adjust transmitting properties in accordance with the method described above The benefits of the invention include improvement to the quality of data communication service in an elevator car. The present invention enhances the quality by various means. A benefit of the invention is that the service can be provided during the whole elevator journey without causing interference to other wireless local area networks in the building. Furthermore, the service is provided so that the persons using the service do not need to make any changes to their devices as they can connect to the local base station located in the elevator. Furthermore, a benefit of the invention is that the error rate caused by high speed in elevators installed in high buildings can be reduced. In addition to the mentioned benefits it is a further benefit that the present invention may be used in an open elevator shaft for more than one elevator as the transmission parameters may be adjusted so that the interference caused by other elevators and transmissions is minimized.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
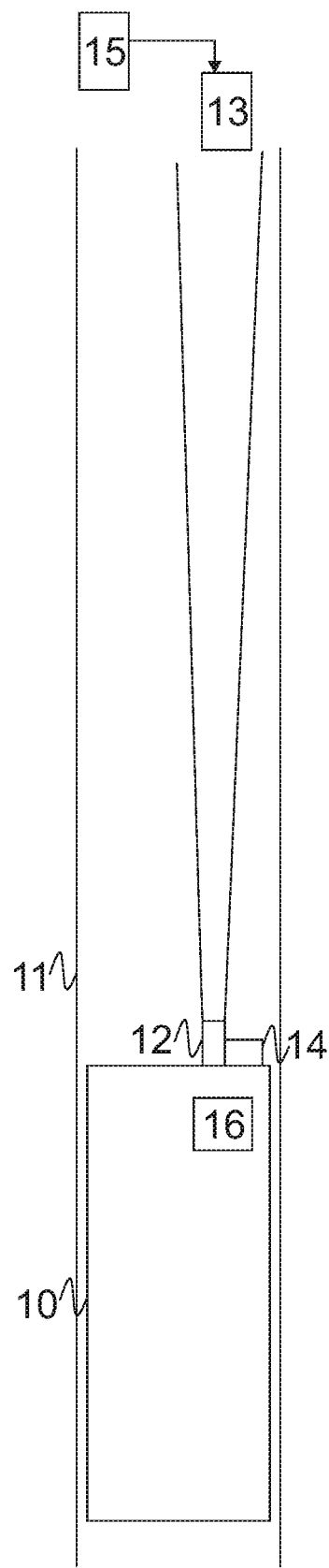
FIG. 1 is a block diagram of an example embodiment of the present invention.

In FIG. 1 a block diagram of an embodiment of the present invention is disclosed. In the embodiment an elevator car 10 is travelling in an elevator shaft 11. Ropes and traction means used for moving the elevator are not shown in the figure as showing them is not necessary for understanding the invention and a person skilled in the art knows that ropes and traction means have to be in their place. In the following examples a mobile device user is provided as an example, however, in addition to providing a network connection to a mobile device user the present invention may be used for providing network connection to devices located permanently in an elevator car. An example of such device is a display panel providing information to passengers. The network connection may be prioritized so that permanent devices get higher priority and the mobile devices lower priority. Furthermore, it is obvious to a person skilled in the art that the connection may be limited to permanent devices.

This may be desirable, for example, in cases where the elevator does not have any other communication means and the elevator operator wishes to guarantee the transmissions from the elevator, which can be, for example, any control information, emergency phone and similar.

The elevator car is equipped with a wireless local area network base station 16 for providing network connection to passengers of the elevator. It is typically enough that the coverage the base station 16 covers only the elevator car 10. Thus, only low transmission power is needed. The base station 16 may be any known base station that is commonly used for wireless connections. The base station 16 is configured to transmit the received data further wirelessly. This is achieved by using directional antenna 12. The antenna 12 illustrated in FIG. 1 is an antenna having adjustable directivity. Thus, the degree of directivity can be very high when needed and omnidirectional when directivity is not needed. In the directional mode antenna is configured to communicate with the counterpart transceiver antenna 13, which is also a directional, or adjustable, antenna. Directional transceiver antenna 13 is coupled to a network element that is typically connected to the fixed network and configured to act as a bridge between the wireless network and wired network or a gateway to the wired Internet. The arrangement of directional transmission of antennas 12 and 13 act as a bridge between the wireless base station 12 and the fixed network. The bridging communication may also be using other network technology than the local area network provided in the elevator car, however, a common solution is to use the same technology with directional antennas. Directional antennas 12 and 13 may be coupled to network elements, for example repeaters, that are configured so that directional antennas 12 and 13 do not accept any other transmissions than transmission between them. Thus, even if they do cover long distance they do not cause similar problems than traditional base stations with high transmitting power. Even if the antenna 12 is located on the roof of the elevator car and the counterpart antenna in the top of the elevator shaft a person skilled in the art understands that the configuration needs not to be above the elevator car but can be also under it, in which case the counterpart antenna is naturally in the bottom of the elevator shaft. One benefit of this arrangement is that the most of the signal transmitted from directional antenna typically stays in the elevator shaft. Thus, the signal causes less interference outside the shaft than the conventional omnidirectional antenna.

In a further embodiment the system comprises an elevator controlling system 15 and a controller 14. Controller 14 is in the elevator car and is coupled to the network element controlling antenna 12. As the elevator controlling system 15 knows the location of the elevator the distance between two antennas 12 and 13 can be calculated. Based on the calculated distance the transmission power, or other properties of the transmission, may be adjusted. For example, the directivity of the antenna may be adjusted based on the distance so that the degree of directivity of the antenna is high when the distance is large and when the distance is small the antenna may be adjusted even omnidirectional. In addition to the directivity other properties, such as the direction and the location of the transmission source may be adjusted, which may be particularly beneficial in open shaft including a plurality of elevators and transceivers. Furthermore, when the distance decreases transmission power may also be decreased and vice versa. The power to be used may be estimated or measured on application basis. The purpose of this adjustment is to provide reliable communication with as little interferences as possible. This is enabled by using lower transmission powers when the distance between two antennas is small.

In a further adjustment the elevator controlling system 15 provides controller 14 the speed of the elevator. The movement of the elevator reduces the quality of the service in the elevator, for example, because of the Doppler-effect. These problems may be reduced by decreasing data transfer rate between the two directional antennas. The lower data rate is robust and tolerates errors better than high speed data transfers. Thus, when the elevator is travelling at full speed it is desired to reduce the date transfer rate and it may be increased again when the elevator decelerates again for stop.

In a further embodiment the elevator car comprises two directional, or adjustable, antennas with respective counterparts both ends of the elevator shaft. The elevator may use always the antenna which has smaller distance to the counterpart. This is particularly useful in very high buildings.

In a further embodiment at least some floors are equipped with wireless network base stations that can be used for receiving and transmitting when the elevator has stopped in the coverage Thus, when the elevator stops at a destination floor, antennas 12 and 13 are not used in directional mode for data communication but the connection is switched to omnidirectional mode so that the long distance radio communication can be avoided. This will provide more reliable connection at higher data transfer rates. The system may be implemented in a manner that the persons having their mobile devices connected to the base station 16 do not notice any difference even if the data is routed differently during the journey.

The above mentioned features are such that the elevator controlling system knows the changes in advance. For example, the system knows in which floors the elevator will stop and if it will accelerate to full speed. Thus, for example, the change from local communication back to the long distance directional antennas can be made in advance just before the elevator starts moving. Correspondingly directivity and the transmission power can be adjusted in advance. Thus, in this embodiment the switch between base stations is done similar manner as in mobile communication networks perform the hand over and the communication does not use multiple paths.

A system using more than one transceiver in the elevator shaft may be configured also in a manner that these transceivers continuously receive and transmit and the communication uses multiple paths. For example, when the elevator stops at a floor having a base station both long distance and local communication may be used simultaneously in order to improve the quality of transmission. Correspondingly the elevator car may have more than one antenna so that all antennas are receiving and transmitting so that stations in the elevator and shaft participate to the communication continuously by using, for example, mesh networking technologies where all or at least portion of base stations in the shaft are cooperating with data transmissions.

Figure 2:
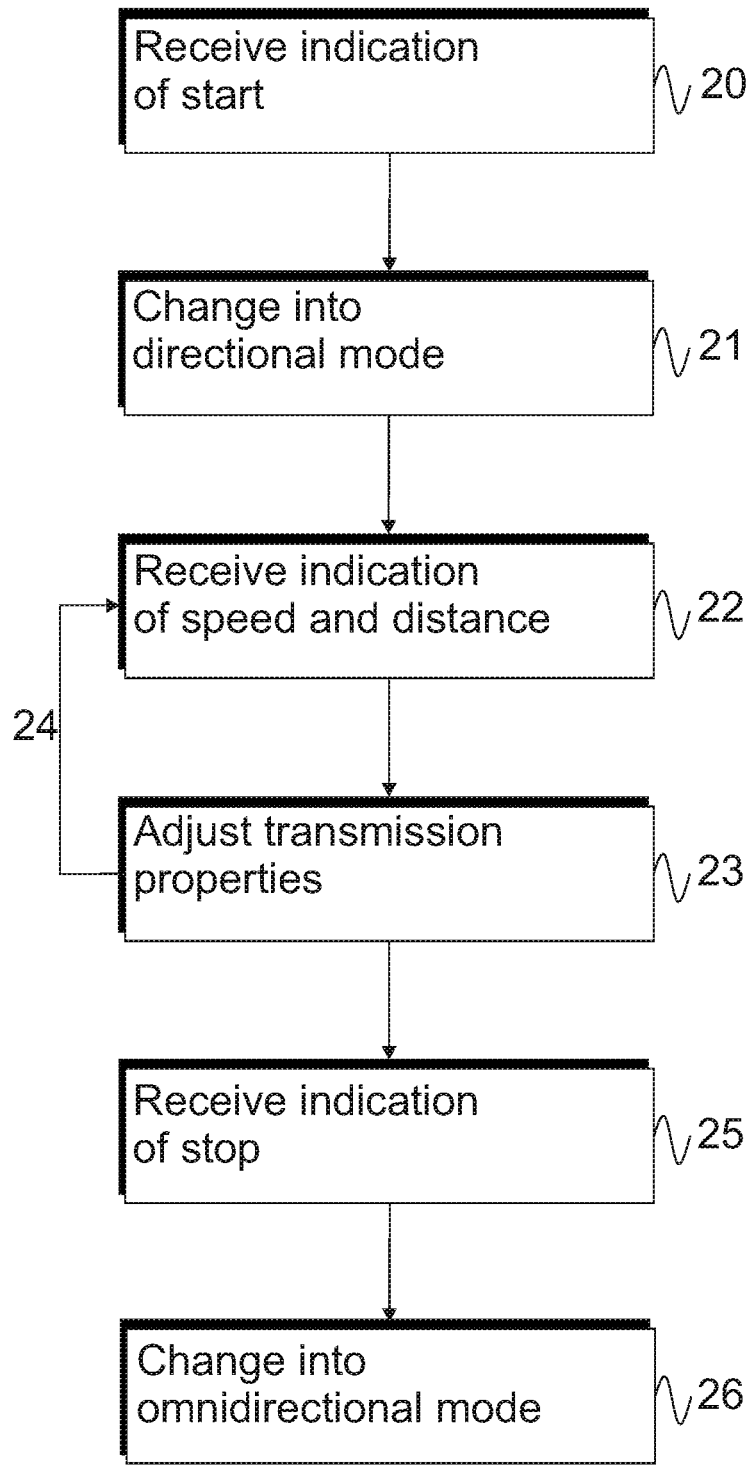
FIG. 2 is a flow chart of an example embodiment of the present invention.

FIG. 2 discloses a method according to an embodiment of the invention. In the method a system similar to the system of FIG. 1 is used. In FIG. 1 only directional antennas are shown, however, the method of FIG. 2 starts from a situation where in an elevator car has stopped to a floor and is using the antenna in omnidirectional mode. Then, the device controlling the network traffic receives an indication that the elevator car is going to start moving, step 20. The indication is typically received such that the transmission antenna can be changed from omnidirectional to directional mode, or if two separate antennas are used from omnidirectional to directional antenna. This is typically done before the elevator car starts moving. Then, based on the indication, the actual change is done, step 21.

When the elevator car is moving the speed of the elevator car and distance between the transmitting and receiving antenna are monitored and communicated to the network controller, which receives the information, step 22. Based on the information it determines if there is a need for change in parameters and adjusts accordingly, step 23. The parameters may be chosen dynamically or there may be a number of pre-selections that are applied accordingly. The pre-selections, such as which data transfer rate to use at certain speed and position in the elevator shaft may be chosen on application basis and may be amended later. The monitoring step is repeated, step 24 until an indication of stopping is received, step 25. Then the network controller is configured to change from directional to omnidirectional mode and connects to a local area network base station located at the floor where the elevator car stopped.

In an embodiment of the invention an elevator car comprises a public display used for displaying live stream received with a data communication arrangement discussed above. In order to further improve the quality of displaying the stream the display is delayed so that in case of errors the system has a possibility to request retransmission of the packets that were not received correctly. The delay period may be buffered so that it will be possible to continue the display even when data transmission problems occur.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for providing a local area wireless network in an elevator car comprising:
   communicating with at least one terminal device using a wireless local area network connection by using at least one wireless base station in said elevator car;
   transceiving said communication between said at least one terminal device and said at least one wireless base station by using a directional antenna at the elevator with a transceiver located in an end of a shaft of the elevator opposing the directional antenna;
   determining a plurality of destination floors for the elevator car;
   predetermining when to switch between the directional antenna and an omnidirectional antenna at the elevator, wherein the omnidirectional antenna communicates with a transceiver located in a vicinity of one of the plurality of destination floors;
   switching said transceiving from said directional antenna to the omnidirectional antenna communicating with the transceiver located in the vicinity of a particular destination floor of the plurality of destination floors where the elevator car stops; and
   switching said transceiving back to said directional antenna after the elevator car starts moving again from the particular destination floor.

2. The method according to claim 1, wherein said switching is performed by adjusting transmission properties of the antenna that is being used for said transceiving.

3. The method according to claim 1, wherein said communication is arranged through a plurality of base stations arranged in a mesh network.

4. The method according to claim 1, wherein the method further comprises:

determining the speed of the elevator car; and
choosing the data transmission speed according said speed of the elevator car.

5. The method of claim 1, wherein, when the elevator car stops on a particular destination floor, the method further comprises:
determining a distance between said omnidirectional antenna located on the elevator car and said transceiver located in the vicinity of the stopping location on one of the plurality of destination floors; and
adjusting transmitting properties in said transceiving according to said determined distance.

6. The method according to claim 5, wherein adjusting at least one of the following properties: transmission power, directivity of the antenna, direction of the transmission, location of the source of the transmission and data transfer rate.

7. The method of claim 1, wherein prior to the elevator car starting to move, predetermining when to switch between the directional antenna and the omnidirectional antenna at the elevator further comprises:
predetermining to switch said transceiving from said directional antenna to an the omnidirectional antenna communicating with a transceiver located in a vicinity of a first anticipated stopping location of the elevator car on one of the plurality of destination floors based on the first anticipated stopping location of the elevator car; and
predetermining whether to switch said transceiving back to said directional antenna after the elevator car reaches the first anticipated stopping location and after the elevator car starting to move again based on a second anticipated stopping location of the elevator car; and
storing the of predetermination of switching of said transceiving based on the first anticipated stopping location of the elevator car and on the second anticipated stopping location of the elevator car.

8. A system for providing a local area wireless network in an elevator car, which system further comprises:
at least one wireless local area base station configured to communicate with at least one terminal device in said elevator car; and
a directional antenna configured to transceive said communication between said at least one terminal device and said at least one wireless base station by using the directional antenna at the elevator with a transceiver located in an end of a shaft of the elevator opposing the directional antenna,
an elevator controlling system; and
a controller configured to
adjust transmitting properties,
determine a plurality of destination floors for the elevator car,
predetermine when to switch between the directional antenna and an omnidirectional antenna at the elevator,
wherein the omnidirectional antenna communicates with a transceiver located in a vicinity of one of the plurality of destination floors;
switch said transceiving from said directional antenna to the omnidirectional antenna communicating with the transceiver located in the vicinity of a particular destination floor of the plurality floors where the elevator car stops; and
switching said transceiving back to said directional antenna after the elevator car starts moving again from the particular destination floor.

9. The system according to claim 8, wherein the controller is further configured to perform said switching by adjusting transmission properties of the antenna that is being used for said transceiving.

10. The system according to claim 8, wherein said communication is arranged through a plurality of base stations arranged in a mesh network.

11. The system according to claim 8, wherein said controller is configured to adjust at least one of the following properties: transmission power, directivity of the antenna, direction of the transmission, location of the source of the transmission and data transfer rate.

12. The system according to claim 8 wherein prior to the elevator car starting to move, predetermining when to switch the directional antenna and the omnidirectional antenna at the elevator further comprises:
predetermining to switch said transceiving from said directional antenna to an omnidirectional antenna communicating with a transceiver located in a vicinity of a first anticipated stopping location of the elevator car on one of the plurality of destination floors based on the first anticipated stopping location of the elevator car;
predetermining whether to switch said transceiving back to said directional antenna after the elevator car reaches the first anticipated stopping location and prior to the elevator starting to move again based on a second anticipated stopping location of the elevator car; and
storing the predetermination of switching of said transceiving based on the first anticipated stopping location of the elevator car and the second anticipated stopping location of the elevator car.

* * * * *